Dec. 7, 1948.  J. W. HARBANOFF  2,455,416
DEVICE FOR SLICING EGGS INTO LAYERS
Filed Feb. 3, 1947

INVENTOR.
Joseph W. Harbanoff
BY Richard J. Geier
ATTORNEYS

Patented Dec. 7, 1948

2,455,416

UNITED STATES PATENT OFFICE 2,455,416

DEVICE FOR SLICING EGGS INTO LAYERS

Joseph W. Harbanoff, New York, N. Y.

Application February 3, 1947, Serial No. 726,151

1 Claim. (Cl. 146—147)

This invention relates to food slicers and refers more particularly to food slicing means adapted for use in restaurants, lunch rooms and the like, as well as by the housewife.

An object of the invention is to provide a cheap, simple and portable article with few parts which will rapidly and accurately slice certain common foods such as eggs, sausage, cheese, and similar condiments.

Other objects of the present invention will become apparent in the course of the following specification.

The objects of the present invention may be realized through the provision of an article containing a series of plates provided with a hole in which the food may be inserted, whereupon the food may be sliced into convenient layers by means of a swinging gate knife. Thus the entire operation of the article requires only two movements, namely, locating the food and swinging the knife.

The invention will appear more clearly from the following detailed description when taken in connection with the accompanying drawings showing, by way of example, a preferred embodiment of the inventive idea.

Figure 1:
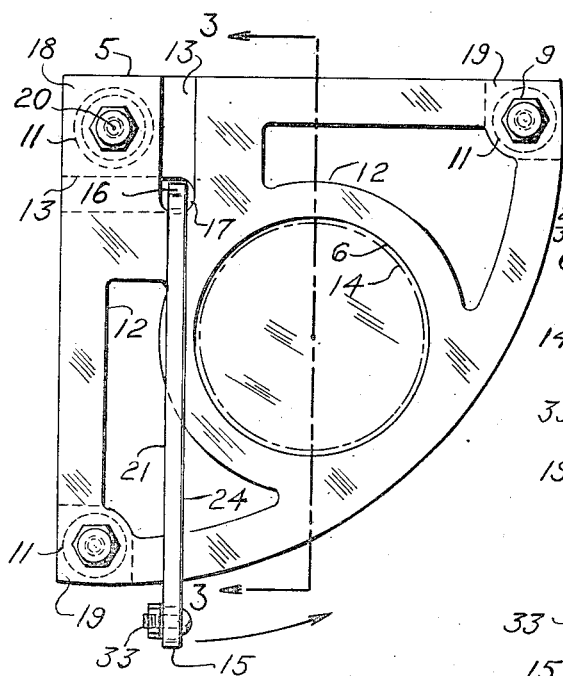
Figure 1 is a plan view of the food slicer constructed in accordance with the principles of the present invention.
Figure 2:
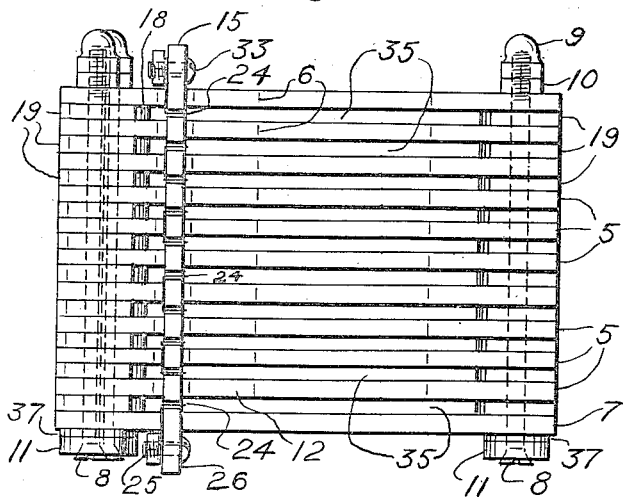
Figure 2 is a side elevation.

It will be seen from Figs. 1 and 2 that the food slicer is composed of ten identical plates 5 placed vertically one over the other. These ten plates 5 each have a hole 6 which of course should be made the proper size to accommodate the food in question, such as eggs, Bologna, liverwurst, cheese and the like. The plates may be made of any suitable material, such as plastics, glass, wood or metal, and may be transparent, translucent or opaque.

There is also an eleventh plate 7 which has no hole since the food must naturally rest on this plate 7 while being sliced.

Figure 3:
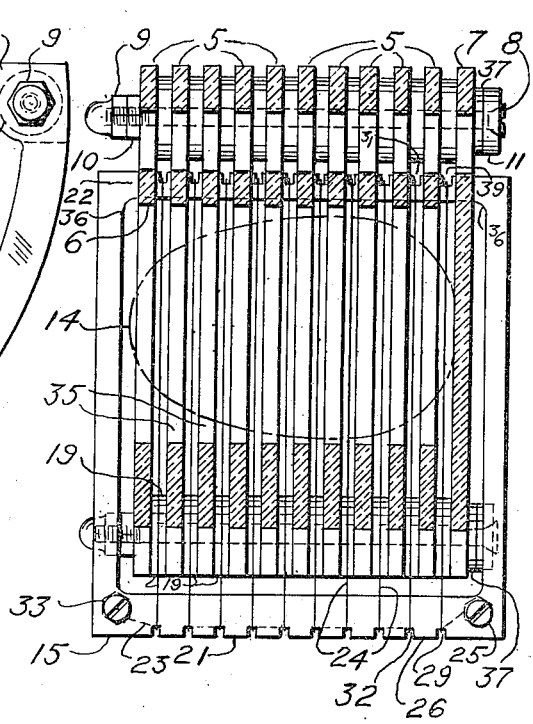
Figure 3 is a sectional view along the line 3—3 of Fig. 1, looking in the direction of the arrows.

All of the above plates are bolted together, as shown on Figs. 2 and 3, one above the other, by means of bolts 8 which have cap nuts 9 and lock nuts 10 at the upper end. At the lower end of the bolts 8, there are installed rubber or fibre washers 11 on which the assembly may rest. There is also a steel washer 37 used to give bearing against the material of the plates.

All of the above plates 5 and 7 have holes 12 for lightening purposes.

Furthermore each and all of the plates 5 and 7 have slots 13 although these slots are differently located in assembly. It will be seen then that all plates 5 and 7 could be made up from the same dies since they are alike except that plate 7 has no food hole 6. The egg 14 in phantom in Fig. 3 is shown resting on plate 7.

In the assembly of the plates, the top plate 5 and the bottom plate 7 are reversed with respect to the intermediate plates so that the slots 13 of the top plate 5 and the bottom plate 7 are located to the side of the slots 13 of the intermediate plates which are all in alinement. Then the swinging knife assembly 15 may be pivoted at 16 where a vertical socket 17 is formed by this arrangement.

In order to provide the desired space between the plates so that the food may be sliced to the desired thickness, the spacers 18 and 19 are inserted, as shown in Figs. 2 and 3, the spacers 18 being inserted at the point 20 behind the pivot 16 of the swinging gate knife assembly 15, while the spacers 19 are installed at the corners.

The knife assembly 15 is composed of a metal frame 21 which is assembled with the right vertical side 22 in the vertical socket 17 in such a way that it is free to swing in the direction of the arrow in Fig. 1 or in the reverse direction.

On the frame 21 is a fine steel wire 23 which is arranged and strung or routed in such a way that it forms ten horizontal cutters 24.

This is done by routing the fine steel wire 23, from the screw 25 in Fig. 3 where it is secured at the bottom of the left vertical side 26 of the knife frame 21, through the slot 29 to the right vertical side 22 of the knife frame 21, through a similar slot 39 on the right vertical side 22 of the knife frame 21, thence upward to the next slot 31 and back to the second slot 32 on the left vertical side 26 of the knife frame 21. This process is continued until there are ten horizontal cutters 24 whereupon the end of the wire is secured by screw 33 at the left top corner of frame 21, as shown on Figs. 2 and 3.

The food slicer is operated as follows:

When the gate knife assembly is swung in the direction of the arrow (or vice versa), as shown on Fig. 1, each of the horizontal cutters 24 will be guided in its path by the plates 5 and 7 and must necessarily travel through a space 35, and in so doing will slice the food in a certain very definite plane, thus making an accurately cut slice between every two cutters. It should also be added that the fillets 36 at the upper and lower inner ends of the right vertical side 22 of the knife frame 21 are accurately located, so that they bear on the edge of the top plate 5 and the bottom plate 7, thus locating the frame 21 in a certain definite position in its travel.

It is apparent that the thickness of the food slices may be easily altered by using thinner or thicker spacers 21 and 23. These spacers may be changed by removing the bolts 8 and installing the new spacers and replacing the bolts 8. In this case it would also be necessary to replace the knife assembly 15 with another knife assembly of the proper size. Furthermore, the illustrated food slicer is capable of other variations and modifications without departing from the scope or intent of the present invention. All of such variations and modifications are to be included within the scope of the present invention.

What is claimed is:

A food slicer comprising a plurality of plates of substantially the same form, each of said plates having a corner and two other corners equidistant therefrom, straight edges joining the first-mentioned corner with said two other corners and a circular edge joining said two other corners with each other, a plurality of spacers located at said corners and maintaining said plates uniformly spaced one directly above the other, bolts extending through said spacers and said corners of the plates, those of said plates which are located above the lowermost plate having a substantially central opening formed therein for receiving food to be sliced, each of said plates having a slot formed therein and extending close to the first-mentioned corner from one of said straight edges and parallel to the other straight edge, the location of at least one of said plates being reversed in relation to other plates so that the walls of the slot thereof extend transversely to the walls of the slots of said other plates, a cutting frame having a pivotal portion extending through said slots, an outer portion located beyond said circular edge and extending parallel to said pivotal portion, and transverse portions joining said pivotal and outer portions and extending on opposite sides of said plates, whereby said cutting frame is swingably mounted in said slots, and cutting elements carried by said pivotal and outer portions and moving between said superposed plates and across said central opening when said cutting frame is swung.

JOSEPH W. HARBANOFF.

REFERENCES CITED

The following references are of record in the file of this patent:

UNITED STATES PATENTS

| Number | Name | Date |
|---|---|---|
| 283,686 | Tripp | Aug. 21, 1883 |
| 2,073,257 | Van Riper | Mar. 9, 1937 |
| 2,413,382 | Sargent et al. | Dec. 31, 1946 |